United States Patent
Kangas et al.

(10) Patent No.: US 9,811,926 B2
(45) Date of Patent: Nov. 7, 2017

(54) TOUCH SCREEN GESTURE FOR PERFECT SIMPLE LINE DRAWINGS

(71) Applicant: Lenovo Enterprise Solutions (Singapore) PTE. LTD., New Tech Park (SG)

(72) Inventors: Paul D. Kangas, Raleigh, NC (US); Daniel M. Ranck, Apex, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/003,666

(22) Filed: Jan. 21, 2016

(65) Prior Publication Data

US 2017/0213366 A1    Jul. 27, 2017

(51) Int. Cl.
G09G 5/00 (2006.01)
G06T 11/20 (2006.01)
G06F 3/0488 (2013.01)
G06T 11/80 (2006.01)
G06F 3/0484 (2013.01)

(52) U.S. Cl.
CPC ........ *G06T 11/203* (2013.01); *G06F 3/04845* (2013.01); *G06F 3/04883* (2013.01); *G06T 11/80* (2013.01)

(58) Field of Classification Search
CPC .............. G06F 3/04883; G06F 3/0488; G06F 3/03545; G06F 3/017
USPC ........................................ 345/173, 179, 665
See application file for complete search history.

(56) References Cited

U.S. PATENT DOCUMENTS

| | | | | |
|---|---|---|---|---|
| 8,887,102 B2 * | 11/2014 | Fu | ........................ | G06F 3/04883 345/173 |
| 9,069,398 B1 * | 6/2015 | Sadhvani | ................ | G06F 3/041 |
| 9,423,953 B2 * | 8/2016 | Delattre | .............. | G06F 3/04883 |
| 2002/0141643 A1 * | 10/2002 | Jaeger | ................... | G06F 3/0481 382/181 |
| 2004/0027397 A1 * | 2/2004 | Sato | ....................... | G06F 3/0421 715/863 |
| 2010/0149109 A1 * | 6/2010 | Elias | ................... | G06F 3/04845 345/173 |
| 2011/0109581 A1 * | 5/2011 | Ozawa | .................. | G06F 3/0481 345/173 |
| 2011/0169756 A1 * | 7/2011 | Ogawa | ................ | G06F 3/03545 345/173 |

(Continued)

OTHER PUBLICATIONS

Stackoverflow, "Draw a Perfect Circle from User's Touch", Last edited Sep. 22, 2013, http://stackoverflow.com/questions/18934805/draw-a-perfect-circle-from-users-touch, Last visited Jan. 21, 2016.

(Continued)

*Primary Examiner* — Kimberly A Williams
(74) *Attorney, Agent, or Firm* — Kunzler Law Group

(57) ABSTRACT

A method for drawing shapes includes receiving first input from a touch screen display indicating a first user touch continuing for a first touch time delay, then subsequent to said first touch time delay, receiving second input from the display indicating a second user touch in a pattern on the display. The method includes correlating the first input and the second input with a drawing shape. The drawing shape includes a standard geometric shape. The method includes forming an image on the display that corresponds to the drawing shape.

17 Claims, 8 Drawing Sheets

(56) References Cited

U.S. PATENT DOCUMENTS

| | | | |
|---|---|---|---|
| 2011/0175821 A1* | 7/2011 | King | G06F 3/04883 345/173 |
| 2011/0298830 A1* | 12/2011 | Lam | G06F 3/04883 345/661 |
| 2012/0262386 A1* | 10/2012 | Kwon | G06F 3/04886 345/173 |
| 2013/0016126 A1* | 1/2013 | Wang | G06F 3/041 345/650 |
| 2013/0061163 A1* | 3/2013 | Clark | G06F 19/708 715/771 |
| 2014/0028578 A1* | 1/2014 | Dinh | G06F 3/04883 345/173 |
| 2014/0028595 A1* | 1/2014 | Lee | G06F 3/04883 345/173 |
| 2014/0253558 A1* | 9/2014 | Zhan | G06K 9/00476 345/441 |
| 2015/0042584 A1* | 2/2015 | Lee | G06T 11/60 345/173 |
| 2015/0145784 A1* | 5/2015 | Dowd | G06F 3/0488 345/173 |
| 2015/0338942 A1* | 11/2015 | Stone | G06F 3/0488 345/173 |
| 2015/0363035 A1* | 12/2015 | Hinckley | G06F 3/0383 345/173 |
| 2016/0291833 A1* | 10/2016 | Ugawa | G06F 3/0416 |

OTHER PUBLICATIONS

Ellen Finkelstein, "Using PowerPoint with a touch screen—on a tablet", Last edited Dec. 17, 2013, http://www.ellenfinkelstein.com/pptblog/using-powerpoint-touch-screen/, Last Visited Jan. 21, 2016.

* cited by examiner

TOUCH SCREEN GESTURE FOR PERFECT SIMPLE LINE DRAWINGS

BACKGROUND

Description of the Related Art

Touch screens are becoming larger and designed into large displays, such as large tablet computers or larger electronic white boards where a user can hand draw using traditional dry erase markers, and then store the drawings or illustrations. With the larger touch screen displays, improvement in hand drawing capability is useful to make more diagrams readable and for use as engineering drawings and modern illustrating techniques.

Existing methods for drawing on a touch screen are similar to the interface for using a mouse and use selection of a shape icon in a tray. The existing solutions are not efficient for using a finger of a user to illustrate and are not intuitive for drawing shapes, such as circles and semicircles. Hand drawings are typically not true geometric shapes and include inaccuracies caused by drawing freehand without a template.

BRIEF SUMMARY

A method for drawing shapes is disclosed. A computer program product and apparatus also perform the functions of the method. The method for drawing shapes includes receiving first input from a touch screen display indicating a first user touch continuing for a first touch time delay, then subsequent to said first touch time delay, receiving second input from the display indicating a second user touch in a pattern on the display. The method includes correlating the first input and the second input with a drawing shape. The drawing shape includes a standard geometric shape. The method includes forming an image on the display that corresponds to the drawing shape.

In one embodiment, the method includes sending a confirmation signal to the user in response to continuing the first user touch at a fixed location for the first touch time delay. In another embodiment, orientation and sizing of the image is based on the first input and the second input and includes a position of the first user touch, a position of the second user touch, and/or subsequent user movement in the pattern and associated with the second user touch. In another embodiment, the method includes receiving additional input from the display indicating further movement associated with the second user touch, and/or movement associated with the first user touch, and forming at least a portion of the image based on the additional input after correlating the first input and the second input to a drawing shape and forming at least a portion of the image from one or more of the first input and the second input.

In one embodiment, the method includes receiving input from the display indicating a stoppage of movement associated with one or more of the first user touch and the second user touch where the first user touch maintains a fixed position and the second user touch maintains a fixed position. The embodiment includes determining that a stoppage time delay has expired, receiving additional input after the stoppage time delay, where the additional input indicates movement associated with the first user touch and/or movement associated with the second user touch, and resizing and/or repositioning the image in response to the additional input. In a further embodiment, the method includes sending a resize/reposition signal to the user in response to expiration of the stoppage time delay and prior to receiving the additional input.

In another embodiment, the image is a first image and the first user touch includes movement and maintaining the first user touch in a fixed position after the movement. The embodiment includes forming a second image on the display based on the movement associated with the first user touch and prior to maintaining the first user touch in a fixed position. The first touch time delay starts in response to maintaining the first user touch in the fixed position. In a further embodiment, the first image is a continuation of the second image. In another embodiment, the drawing shape is an arc and where the second image is a preliminary shape with a first point located at a position on the display associated with commencement of the first user touch and a second point located at a position on the display associated with the maintaining the first user touch in a fixed position, and where the second user touch is on the second image. The first image in the form of an arc is formed by subsequent user movement associated with the second user touch in a direction away from a line bisecting the first point and the second point.

In one embodiment, the drawing shape is a line and where the pattern, comprising subsequent user movement after the second user touch, includes at least a movement that is toward a position of the first user touch. Receiving input from the display indicating subsequent user movement away from the position of the first user touch after movement toward the position of the first user touch is used to determine position, direction and length of the line. In another embodiment, the drawing shape is a semicircle and the pattern, comprising subsequent user movement after the second user touch, includes a circular movement. Forming an image on the display includes forming a semicircle starting at the second user touch and the semicircle ends at a position corresponding to a position where movement associated with the second user touch ends by stopping movement associated with the second user touch or ending the second user touch.

In another embodiment, the drawing shape is a circle and the pattern, comprising subsequent user movement after the second user touch, includes a circular movement in a first direction in conjunction with circular movement in the first direction subsequent to the first user touch and associated with the first user touch. Forming an image on the display includes forming a circle with a diameter corresponding to a position of the first user touch and a position of the second user touch.

A program product for drawing a shape includes a computer readable storage medium that stores executable code that is executable by a processor. The executable code includes code to perform receiving first input from a touch screen display indicating a first user touch continuing for a first touch time delay, and subsequent to said first touch time delay, receiving second input from the display indicating a second user touch in a pattern on the display. The executable code includes code to perform correlating the first input and the second input with a drawing shape, where the drawing shape is a standard geometric shape, and forming an image on the display that corresponds to the drawing shape.

In one embodiment, the executable code further includes code to perform sending a confirmation signal to the user in response to continuing the first user touch at a fixed location for the first touch time delay. In another embodiment, the executable code further includes code to perform receiving input from the display indicating a stoppage of movement associated with the first user touch and/or the second user touch where the first user touch maintains a fixed position and the second user touch maintains a fixed position, determining that a stoppage time delay has expired, receiving additional input after the stoppage time delay, where the additional input indicates movement associated with the first user touch and/or movement associated with the second user touch, and resizing and/or repositioning the image in response to the additional input.

An apparatus for drawing shapes includes a first input module that receives first input from a touch screen display indicating a first user touch continuing for a first touch time delay and a second input module that, subsequent to said first touch time delay, receives second input from the display indicating a second user touch in a pattern on the display. The apparatus includes a correlation module that correlates the first input and the second input with a drawing shape, where the drawing shape is a standard geometric shape, and an image module that forms an image on the display that corresponds to the drawing shape.

In one embodiment, the apparatus includes a confirmation module that sends a confirmation signal to the user in response to continuing the first user touch at a fixed location for the first touch time delay. In another embodiment, the apparatus includes an additional input module that receives additional input from the display indicating further movement associated with the second user touch and/or movement associated with the first user touch. The image module forms at least a portion of the image based on the additional input after the correlation module correlates the first input and the second input to a drawing shape and after the image module forms at least a portion of the image based on the first input and/or the second input.

In another embodiment, the apparatus includes a stop module that receives input from the display indicating a stoppage of movement associated with one or more of the first user touch and the second user touch where the first user touch maintains a fixed position and the second user touch maintains a fixed position, and a stop delay module that determines that a stoppage time delay has expired. In the embodiment, the apparatus includes a sizing input module that receives additional input after the stoppage time delay, where the additional input indicates movement associated with the first user touch and/or movement associated with the second user touch, and a position module that resizes and/or repositions the image in response to the additional input. In another embodiment, the apparatus includes a position signal module that sends a resize/reposition signal to the user in response to expiration of the stoppage time delay and prior to receiving the additional input.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described with additional specificity and detail through the use of the drawings, in which.

DETAILED DESCRIPTION

Figure 1:
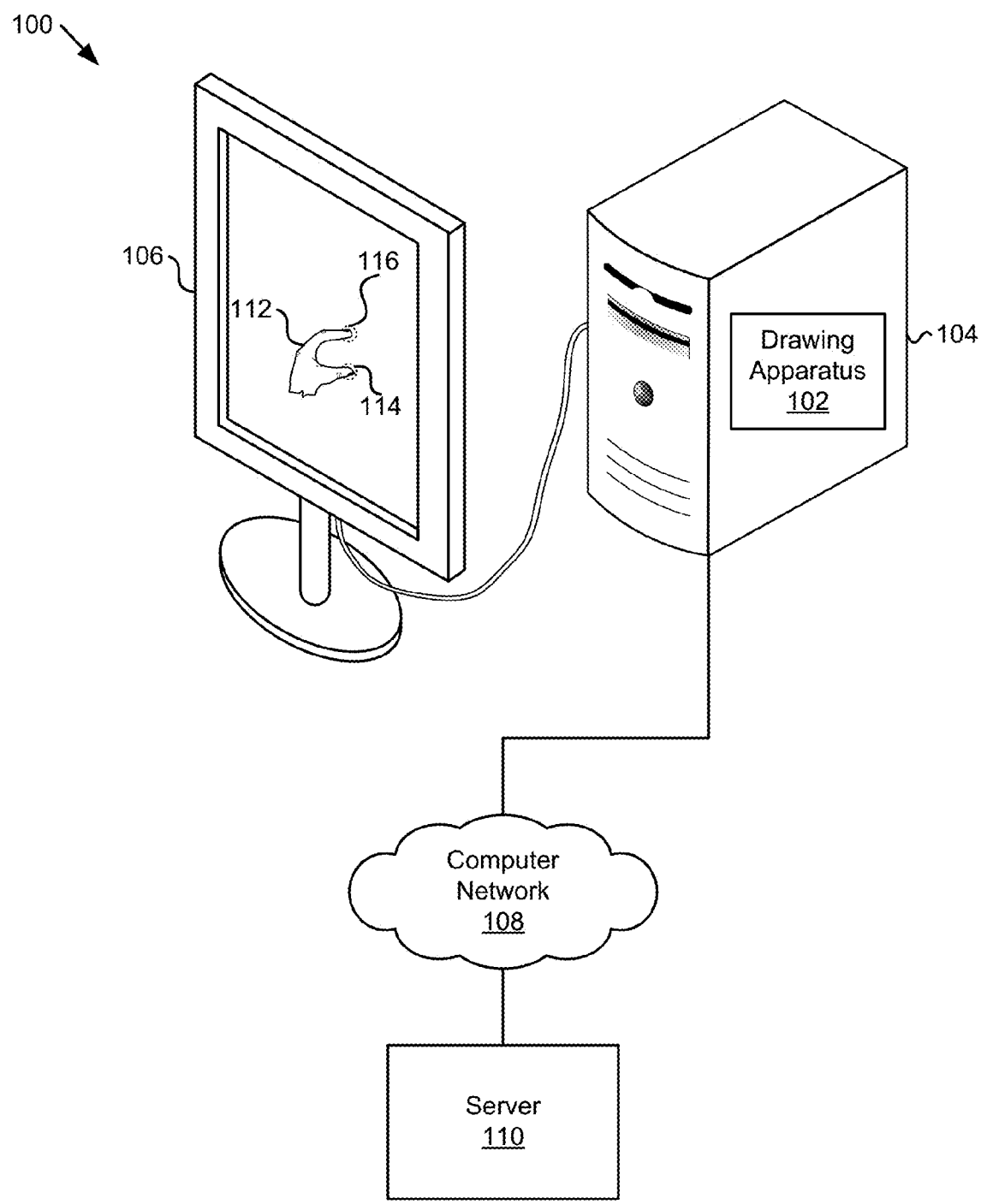
FIG. 1 is a schematic block diagram illustrating one embodiment of a system for drawing images.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable executable code, computer readable code, and/or program code, referred hereafter as executable code. The storage devices may be tangible, non-transitory, and/or non-transmission. The storage devices do not embody signals. In a certain embodiment, the storage devices only employ signals for accessing executable code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in executable code and/or software for execution by various types of processors. An identified module of executable code may, for instance, comprise one or more physical or logical blocks of executable code which may, for instance, be organized as an object, procedure, or function. Nevertheless, the executable code of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different executable code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the executable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Executable code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by executable code. These executable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The executable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The executable code may also be loaded onto a computer, other programmable data processing apparatus, or other devices to cause a series of operational steps to be performed on the computer, other programmable apparatus or other devices to produce a computer implemented process such that the executable code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of executable code, which comprises one or more executable instructions of the executable code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and executable code.

The description of elements in each figure may refer to elements of proceeding figures. Like numbers refer to like elements in all figures, including alternate embodiments of like elements.

FIG. 1 is a schematic block diagram illustrating one embodiment of a system 100 for drawing images. The system 100 includes a drawing apparatus 102 in a computer 104 connected to an electronic touch screen display 106 ("display 106"), a computer network 108, a server 110, a hand 112 of a user, a first user touch 114 and a second user touch 116, which are described below.

The drawing apparatus 102 receives input from the display 106 based on the user touching the display 106 and interprets a pattern from the user's touch to select a drawing image, which is a standard geometric shape, such as a semicircle, a line, an arc, a circle, a square, etc. The drawing apparatus 102 is described in more detail with regard to the apparatuses 200, 300 of FIGS. 2 and 3. While the drawing apparatus 102 is depicted in the computer 104, all or part of the drawing apparatus 102 may also be located on a server 110 or other remote computing device in communication with the computer 104 over a computer network 108.

The drawing apparatus 102 may include modules which may be stored on computer readable storage media on the computer 104, on the server 110, or on a computer readable storage device accessible to the computer 104 or server 110. In another embodiment, all or a portion of the modules may include hardware circuits, such as elements of the display 106 that allow sensing of user touch. In other embodiments, one or more of the modules are implemented using a programmable logic device, such as a field programmable gate array, a programmable logic array, an application specific integrated circuit, and the like.

The system 100 includes a computer 104. The computer 104 may be a desktop computer, a workstation, and the like with a separate display 106 as depicted. In other embodiments, the computer 104 is integrated with the display 106 and may be a smartphone, a tablet computer, a laptop computer, an all-in-one computer, and the like. The electronic touch screen display 106 is a combination display and touch screen that receives input from a user in the form of a touch. In one embodiment, the display 106 includes an electronic visual display with a see-through input device layered on top of the electronic visual display. The display 106 may accept input from a user through touch by a body part, such as a finger, or though input using a stylus or other mechanical device. Typically, the display 106 interprets some types of user touch as touching a particular location on the display 106.

Typically the display 106 is capable of discerning a user touch and movement after the touch that is associated with the user touch, such as placing a finger on the display 106 and dragging the finger without lifting the finger. The display 106 is also capable of discerning an end to a user touch when the user lifts the body part or device that is touching the display 106. One of skill in the art will recognize other types of electronic touch screen displays 106 and typical characteristics.

The system 100 includes a server 110 connected to the computer/display 104, 106 over a computer network 108. In one embodiment, the computer network 108 is through a wireless connection. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition the wireless connection may employ a Radio Frequency Identification ("RFID") communication including RFID standards established by the International Organization for Standardization ("ISO"), the International Electrotechnical Commission ("IEC"), the American Society for Testing and Materials ("ASTM"), the DASH7 Alliance, and EPCGlobal.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada. The wireless connection may be an infrared connection including connections conforming at least to the Infrared Physical Layer Specification (IrPHY) as defined by the Infrared Data Association (IrDA). Alternatively, the wireless connection may be a cellular telephone network communication. All standards and/or connection types include the latest version and revision of the standard and/or connection type as of the filing date of this application.

In another embodiment, the computer network 108 includes a hardware connection, such as over a wire, a fiber optic cable, etc. The computer network 108 may include a local area network ("LAN"), a wide area network ("WAN"), a storage area network ("SAN"), the Internet, and the like. The computer network 108 may include multiple networks, such as a combination of wireless and wired networks (including fiber optic cables). The computer network 108 may include servers, routers, switches, and the like. One of skill in the art will recognize other forms of a computer network 108. The server 110 may be a server of a cellular network carrier, an Internet server, a server of an organization or other server that may be connected to the computer/display 104, 106.

The display 106 is depicted being touched by a hand 112 of a user at a first user touch 114 location and a second user touch 116 location. The first user touch 114 and the second user touch 116 are depicted by dashed circles, which may be interpreted by the display 106 as being touched at the center of the circles. The centers of the circles, in one embodiment, each correspond to an approximate center of an area touched by a finger, a stylus, etc. One of skill in the art will recognize techniques of determining a location on the display 106 based on a touch that includes an area larger than the determined location on the display 106. The location on the display 106 may be interpreted as a coordinate with respect to edges of the display 106, edges of a sensing area on the display 106, an origin on the display 106, etc.

Figure 2:
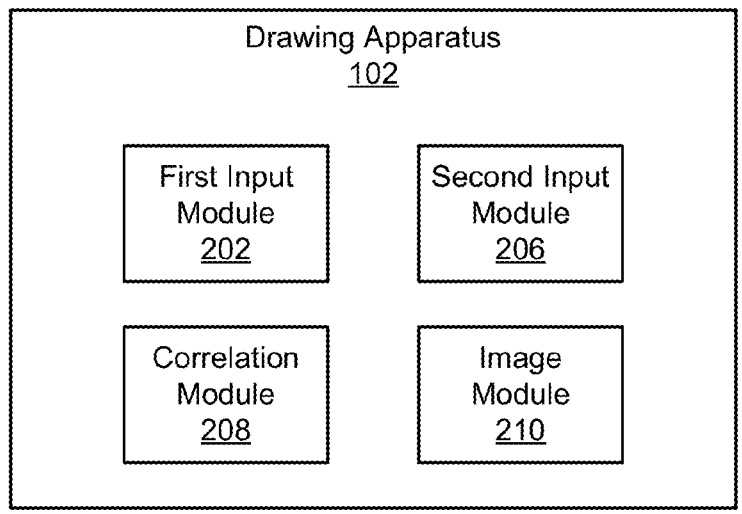
FIG. 2 is a schematic block diagram illustrating one embodiment of an apparatus for drawing images.

FIG. 2 is a schematic block diagram illustrating one embodiment of an apparatus 200 for drawing images. The apparatus 200 includes one embodiment of a drawing apparatus 102 with a first input module 202, a second input module 206, a correlation module 208, and an image module 210, which are described below.

The apparatus 200 includes, in one embodiment, a first input module 202 that receives first input from the touch screen display 106 indicating a first user touch 114 continuing for a first touch time delay. The first user touch 114 may include a touch with a body part, such as a finger, or may include a touch with a stylus, pen, or other mechanical device. The first user touch 114, in one embodiment, includes a stationary user touch. In another embodiment, the first user touch 114 includes a user touch, subsequent movement, and then holding the first user touch 114 in a stationary position. For example, the user may touch the display 106 with a finger and then drag the finger to another location on the display 106 and may then hold the finger stationary. While other movements are possible, holding a first user touch 114 in a stationary position, in one embodiment, signals a start of a delay.

The first input module 202, in one embodiment, is implemented as executable code stored on a computer readable storage media, which may be executed by a processor accessible to the computer 104. In another embodiment, the first input module 202 is implemented using a programmable hardware device. In another embodiment, the first input module 202 may include hardware circuits, such as sensing circuits for sensing the first user touch 114. In other embodiments, the first input module 202 is implemented using a combination of hardware circuits and executable code or a programmable hardware device.

The apparatus 200, in one embodiment, includes a second input module 206 that, subsequent to the first touch time delay, receives second input from the display 106 indicating a second user touch 116 in a pattern on the display 106. The pattern may include a straight line in a particular direction, a curve, or other pattern that may be used to correlate to a particular drawing shape. For example, the pattern may include movement of the second user touch 116 in a direction that is substantially straight toward a location of the first user touch 114. As used herein, when describing movement in a line, the movement may include small deviations from a straight line, but in a generally straight direction.

An advantage of embodiments of the inventions described herein is that by defining a particular shape, the drawing apparatus 102 may form images of particular shapes, such as a straight line, a semicircle, etc. that are more accurate than user touch to form a straight line, a semicircle, etc. For example, where the pattern includes a curved movement, the curved movement may be a part of determining that the user wants to draw a semicircle or circle and the drawing apparatus 102 may form a semicircle without the user being required to trace a perfect semicircle with a finger. The second input module 206, in one embodiment, is implements with similar executable code, hardware circuits, etc. as the first input module 202.

The apparatus 200, in one embodiment, includes a correlation module 208 that correlates the first input and the second input with a drawing shape. The drawing shape includes a standard geometric shape. For example, the correlation module 208 may interpret a first user touch 114 in a fixed position and a second user touch 116 and subsequent movement in a circular shape around the first user touch 114 as selecting a semicircle. Various movements and fixed locations associated with the first user touch 114 and the second user touch 116 may be assigned to certain shapes, such as a line, a semicircle, an arc, a circle, a square, etc. Examples of some movements that correlate to shapes are described in conjunction with FIGS. 6-9.

The correlation module 208, in some embodiments, includes interpreting movements as a pattern when the movements vary from one to another. For example, the correlation module 208 may interpret a range of circular-type movements as correlating with a semicircle while rejecting other circular movements. The correlation module 208 may include certain templates or limits where movement within a template or within certain limits is interpreted as a particular pattern where movement that strays from the template or is beyond the limits may be interpreted as another pattern or as not corresponding to a pattern. By including templates, shapes, etc. that differ from a particular geometric shape, a user may stray from a perfect geometric shape while the drawing apparatus 102 may still correlate the movement to a desired drawing shape. The correlation module 208 may be implemented in executable code, but may also include hardware circuit elements, such as sensors to sense movement across the display 106, etc.

The apparatus 200, in one embodiment, includes an image module 210 that forms an image on the display 106 that corresponds to the drawing shape. For example, where the correlation module 208 detects a pattern corresponding to a semicircle, the image module 210 may draw a semicircle on the display 106. In some embodiments, the image is sized and positioned relative to the first user touch 114 and to the second user touch 116 and subsequent movement. For example, the image module 210 may form a semicircle centered about a location of the first user touch 114 with a diameter corresponding to the second user touch 116, starting at the second user touch 116 and ending after the subsequent movement after the second user touch 116. Various examples of forming an image are described in relation to FIGS. 6-9. The image module 210 may be implemented in executable code or with a programmable hardware device, or may include hardware components such as display elements.

The drawing apparatus 102, in one embodiment, operates in conjunction with a drawing utility. For example, the drawing apparatus 102 may execute as part of a drawing software package running on a computer 104 with an electronic touch screen display 106. In some embodiments, the modules 202-210 of the drawing apparatus 102 function after starting a drawing utility while user touches and movements similar to those of the first input and the second input are ignored while not in the drawing utility. In another embodiment, the drawing apparatus 102 is activated when a drawing program is active and when the user selects a drawing mode that activates the drawing apparatus 102. For example, while the computer 104 or server 110 executes a drawing program, the user may select an icon on the display 106, an entry in a menu, etc. to activate the drawing apparatus 102. In other embodiments, the first input module 202 is active and perceives an appropriate first user touch 114 during general operation of the computer 104. One of skill in the art will recognize times when the drawing apparatus 102 may be active.

Figure 3:
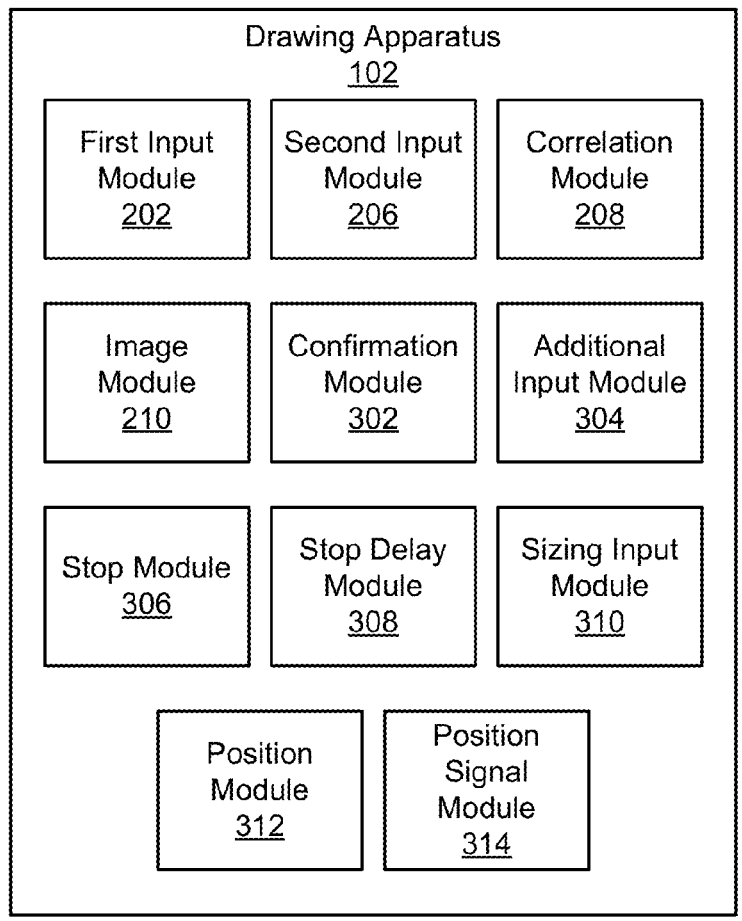
FIG. 3 is a schematic block diagram illustrating another embodiment of an apparatus for drawing images.

FIG. 3 is a schematic block diagram illustrating another embodiment of an apparatus 300 for drawing images. The apparatus 300 includes another embodiment of the drawing apparatus 102 with a first input module 202, a second input module 206, a correlation module 208, and an image module 210, which are substantially similar to those described above in relation to the apparatus 200 of FIG. 2. In various embodiments, the apparatus 300 may also include a confirmation module 302, an additional input module 304, a stop module 306, a stop delay module 308, a sizing input module 310, a position module 312 and a position signal module 314, which are described below.

The apparatus 300, in one embodiment, includes a confirmation module 302 that sends a confirmation signal to the user in response to receiving continued input indicating continued contact on the display 106 of the first user touch 114 and in response to expiration of a first touch time delay. For example, the confirmation module 302 may include a hardware or software timer that starts when the first input module 202 detects the first user touch 114. In one embodiment, the confirmation module 302 doesn't start the timer until the first input module 202 detects the first user touch 114 at a stationary location. At the expiration of a time delay, for example, when the timer counts up or down to a value corresponding to the first touch time delay while the first input module 202 detects continued contact with the display 106, the confirmation module 302 sends the confirmation signal. The first touch time delay may be measured in units of time, clock cycles, etc. In one embodiment, if the first input module 202 detects movement and/or a discontinuation of the first user touch 114 prior to the end of the first touch time delay, the confirmation module 302 does not send the confirmation signal.

The confirmation module 302, in various embodiments, sends a confirmation signal in the form of an audible signal and a visible signal on the display 106. For example, the confirmation signal may include a particular sound, such as a tone, a series of tones, etc. In another embodiment, the confirmation signal includes a visible signal on the display 106, such as appearance on the display 106 of a symbol, flashing around the location of the first user touch 114, and the like. Typically, the confirmation signal is an indicator to the user that the first user touch 114 has been detected for the first touch time delay so that the user can move forward with the second user touch 116. The confirmation module 302 may be implemented in executable code, but may also include hardware elements, such as a speaker, a light-emitting diode ("LED"), particular pixels on the display 106, etc.

The apparatus 300, in some embodiments, includes an additional input module 304 that receives additional input from the display 106 indicating further movement associated with the second user touch 116 and/or movement associated with the first user touch 114. The image module forms at least a portion of the image based on the additional input after the correlation module 208 correlates the first input and the second input to a drawing shape and after the image module 210 forms at least a portion of the image based on the first input and/or the second input.

For example, if the correlation module 208 correlates the first and second inputs to a semicircle, the image module 210 may form part of a semicircle on the display 106 starting at the second user touch 116 and continuing to a current location of a user finger, stylus, etc. associated with the second user touch 116 and subsequent movement. The additional input module 304 may receive additional input from the display 106 indicating that the user is continuing to move the finger, stylus, etc. after the initial movement subsequent to the initial second user touch 116. The additional input module 304 may detect additional movement and the image module 210 may extend the semicircle as the user continues to sweep a finger, stylus, etc. around the first user touch 114.

The apparatus 300 includes, in some embodiments, a stop module 306, a stop delay module 308, a sizing input module 310, and position module 312. The stop module 306 receives input from the display 106 indicating a stoppage of movement associated with the first user touch 114 and/or the second user touch 116 where the first user touch 114 maintains a fixed position and the second user touch 116 maintains a fixed position. For example, after the image module 210 forms the image after movement associated with the first user touch 114 and/or second user touch 116, the stop module 306 may detect that the user has stopped movement on the display 106.

In an alternate embodiment, the stop module 306 detects stoppage of movement when the user discontinues the first user touch 114 and the second user touch 116, for example, by lifting the user's fingers from the display 106. Subsequent user touch may be used to reposition and/or resize the image, as described below. For example, user touch on the image may be interpreted as intent to resize and/or reposition the image, rather than to draw an additional image, when the user touch is on the image.

The stop delay module 308 determines that a stoppage time delay has expired and the sizing input module 310 receives additional input after the stoppage time delay. The additional input indicates movement associated with the first user touch 114 and/or movement associated with the second user touch 116. The position module 312 resizes and/or repositions the image in response to the additional input. For example, the user may be forming a semicircle and may sweep a finger, stylus, etc. around a location of the first user touch 114 and may then stop. The stop module 306 may detect the stoppage and the stop delay module 308 may then start a stop delay timer.

If the stop module 306 determines that the stop delay timer has reached a stoppage time delay while the stop module 306 continues to detect stoppage of movement associated with the first user touch 114 and with the second user touch 116, the sizing input module 310 may then detect additional input from the display 106 indicating further movement associated with the first user touch 114 and/or the second user touch 116. The position module 312 may use the additional input detected by the sizing input module 310 to resize and/or reposition the image on the display 106. In one embodiment, the additional input includes the user re-touching the image after discontinuing the first user touch 114 and the second user touch 116.

In a further embodiment, the apparatus 300 includes a position signal module 314 that sends a resize/reposition signal to the user in response to expiration of the stoppage time delay and prior to receiving the additional input. For example, after the stop delay module 308 determines that the stoppage time delay has expired while the stop module 306 has not detected further movement on the display 106, the position signal module 314 may send an audible and/or visual resize/reposition signal to the user. As with the confirmation signal, the resize/reposition signal may be a particular tone, a particular series of tones, a visual indicator on the display 106, etc. In one embodiment, the resize/reposition signal differs from the confirmation signal.

Figure 4:
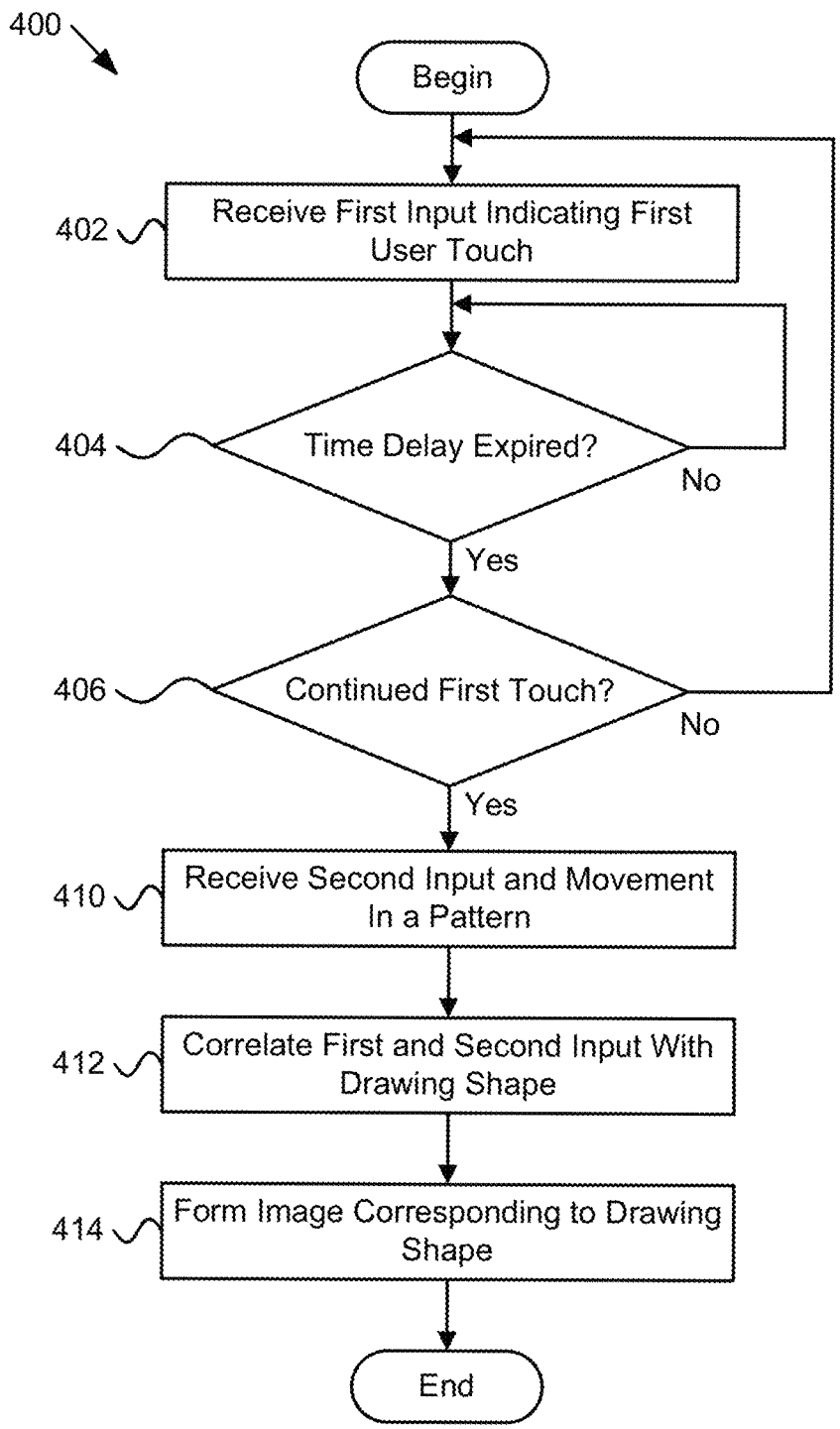
FIG. 4 is a schematic flow chart diagram illustrating one embodiment of a method for drawing images.

FIG. 4 is a schematic flow chart diagram illustrating one embodiment of a method 400 for drawing images. The method 400 begins and receives 402 first input from an electronic touch screen display 106 indicating a first user touch 114. In one embodiment, the first input module 202 receives 402 the first input. The method 400 determines 404 if a first touch time delay has expired. If the method 400 determines 404 that that first touch time delay has not expired, the method 400 returns and continues to determine 404 if the first touch time delay has expired. If the method 400 determines 404 that that first touch time delay has expired, the method 400 determines 406 if there is continued first user touch 114. If the method 400 determines 406 that there is not continued first user touch 114 during the first touch time delay, the method 400 returns to receive 402 first input indicating a first user touch 114.

If the method 400 determines 406 that there is continued first user touch 114 during the first touch time delay, the method 400 receives 410 second input from the display 106 indicating a second user touch 116 and subsequent user movement on the display 106 in a pattern after the second user touch 116 and correlates 412 the first input and the second input with a drawing shape where the drawing shape includes a standard geometric shape. In one embodiment, the method 400 uses the pattern of movement after the second user touch 116 to correlate 412 to the drawing shape. In another embodiment, the method 400 uses more than just the movement after the second user touch 116 to correlate 412 to the drawing shape, for example, by using movement associated with the first user touch 114 before or after the confirmation signal. In one embodiment, the second input module 206 receives 410 the second input and the correlation module 208 correlates 412 the first and second input with a drawing shape. The method 400 forms 414 an image on the display 106 that corresponds to the drawing shape, and the method 400 ends. The image module 210, in one embodiment, forms 414 the image on the display 106.

Figure 5A:
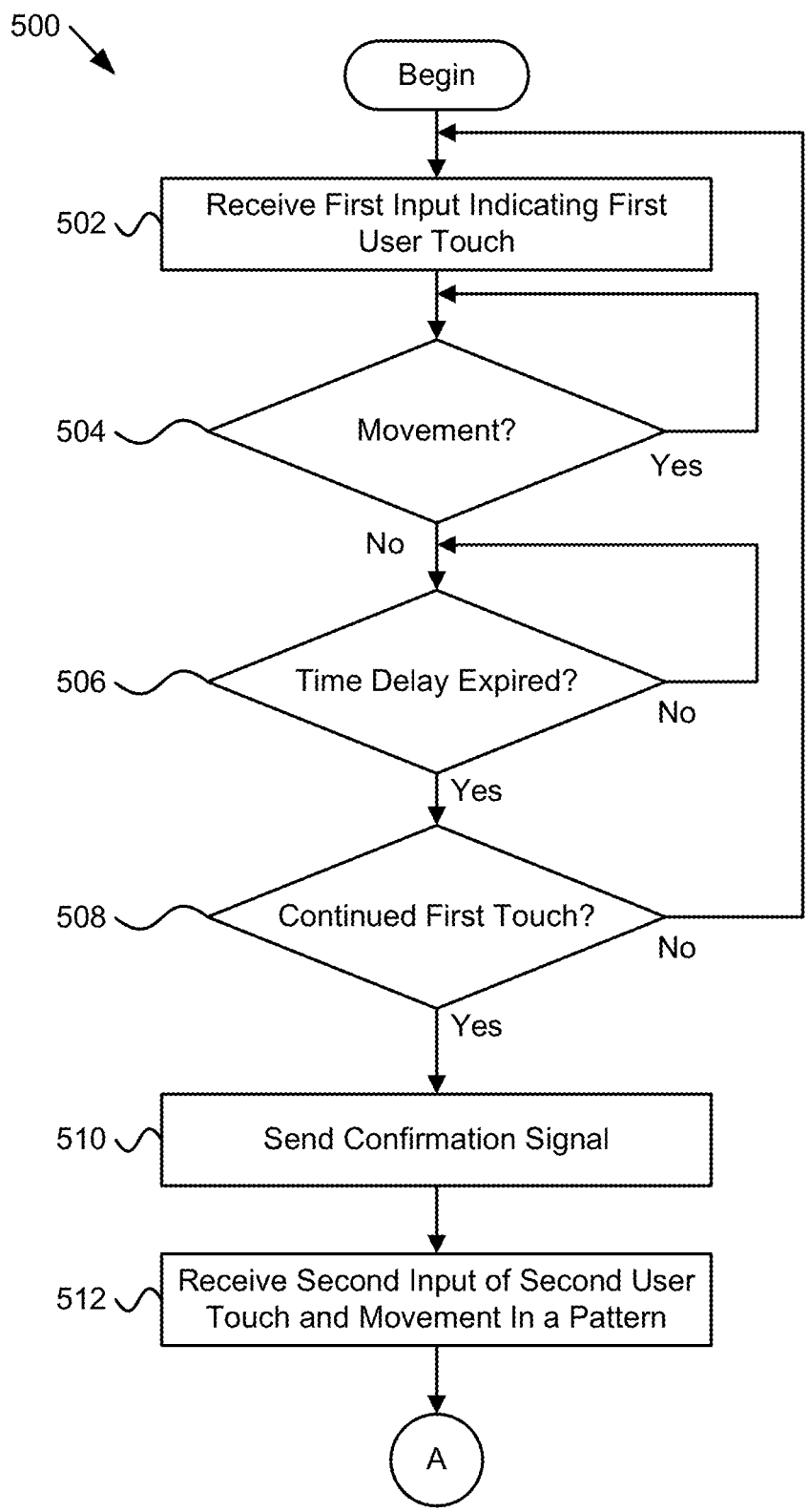
FIG. 5A is a first part of a schematic flow chart diagram illustrating one embodiment of a method for drawing images.
Figure 5B:
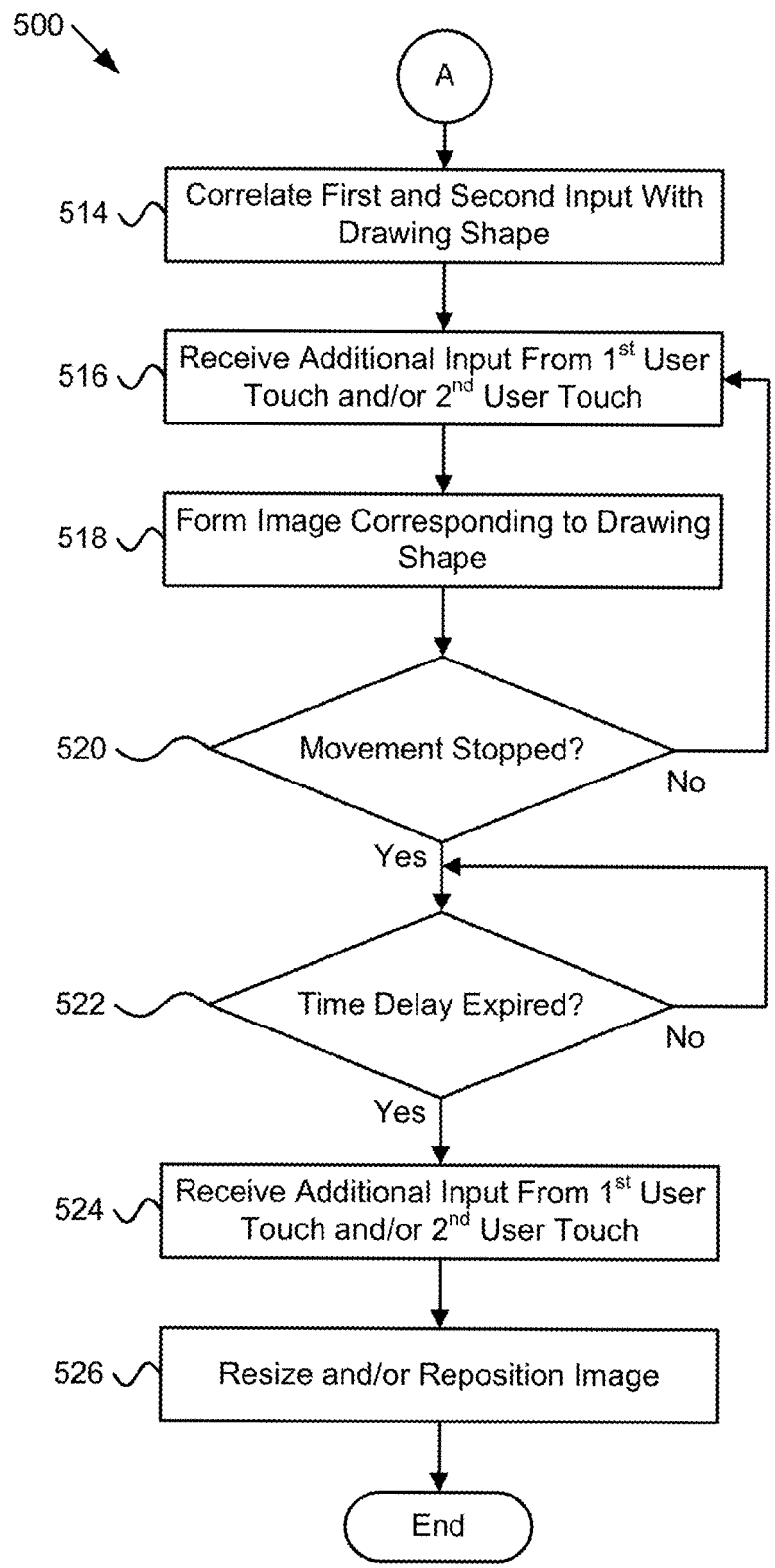
FIG. 5B is a second part of the schematic flow chart diagram illustrating one embodiment of a method for drawing images.

FIGS. 5A and 5B are a first part and a second part of a schematic flow chart diagram illustrating one embodiment of a method 500 for drawing images. The method 500 begins and receives 502 first input from the display 106 indicating a first user touch 114 and the method 500 determines 504 if there is movement associated with the first user touch 114. If the method 500 determines 504 that there is movement associated with the first user touch 114, the method 500 returns and continues to determine 504 if there is movement associated with the first user touch 114.

If the method 500 determines 504 that there is no movement associated with the first user touch 114 (e.g. movement has stopped), the method 500 determines 506 if a first touch time delay has expired. For example, the method 500 may start a timer and monitor the timer to determine 506 if the first touch time delay has expired. If the method 500 determines 506 that the first touch time delay has not expired, the method 500 returns and continues to determine 506 if the first touch time delay has expired. In addition, the method 500 may continue to monitor the first user touch 114 to determine 404 if there for movement.

If the method 500 determines 506 that the first touch time delay has expired, the method 500 determines 508 if there is continued first user touch 114. If the method 500 determines 508 that there is not continued first user touch 114 during the first touch time delay, the method 500 returns to receive 502 first input indicating a first user touch 114. If the method 500 determines 508 that there is continued first user touch 114 during the first touch time delay, the method 500 sends 510 a confirmation signal to the user. In one embodiment, the first input module 202 receives 502 the first input, and the confirmation module 302 determines 504 if there is movement associated with the first user touch 114, determines 506 if the first touch time delay has expired, determines 508 if there is continued first user touch 114 during the first touch time delay, and sends 408 the confirmation signal.

The method 500 receives 512 second input from the display 106 indicating a second user touch 116 and subsequent user movement on the display 106 in a pattern after the second user touch 116, and correlates 514 (follow "A" on FIG. 5A to "A" on FIG. 5B) the first input and the second input with a drawing shape where the drawing shape includes a standard geometric shape. The correlation module 208 may be used to correlate 514 the first input and the second input to the drawing shape. After correlating 514 the first and second input with a drawing shape, the method 500 receives 516 additional input from movement associated with the first user touch 114 and/or associated with the second user touch 116 and forms 518 an image on the display 106 that corresponds to the drawing shape based on the first input, the second input, and/or the additional input from the display 106. The additional input module 304, in one embodiment, may receive 516 the additional input and the image module 210 may form 520 the image on the display 106.

The method 500 determines 520 if movement associated with the first user touch 114 and the second user touch 116 has stopped. If the method 500 determines 520 that movement has not stopped, the method 500 returns and continues to receive 516 additional input and continues to form 518 the image. If the method 500 determines 520 that movement has stopped, the method 500, determines 522 if a stoppage time delay has expired. For example, the method 500 may start a stoppage time delay timer and may monitor the timer. If the method 500 determines 522 that the stoppage time delay has not expired, the method 500 returns and determines 522 if the stoppage time delay has expired. The method 500 may also monitor for movement associated with the first user touch 114 and second user touch 116 during the stoppage time delay and may return and continue to receive 516 additional input and to form 518 the image.

If the method 500 determines 522 that the stoppage time delay has expired, the method 500 receives 524 additional input indicating movement associated with the first user touch 114 and/or the second user touch 116 and resizes 526 and/or repositions 526 the image based on the additional input, and the method 500 ends. In some embodiments, the stop module 306 may determine 520 if movement has stopped, the stop delay module 308 may determine 522 if the stoppage time delay has expired, the sizing input module 310 may receive 524 additional input, and the position module 312 may resize 526 and/or reposition 526 the image.

Figure 6:
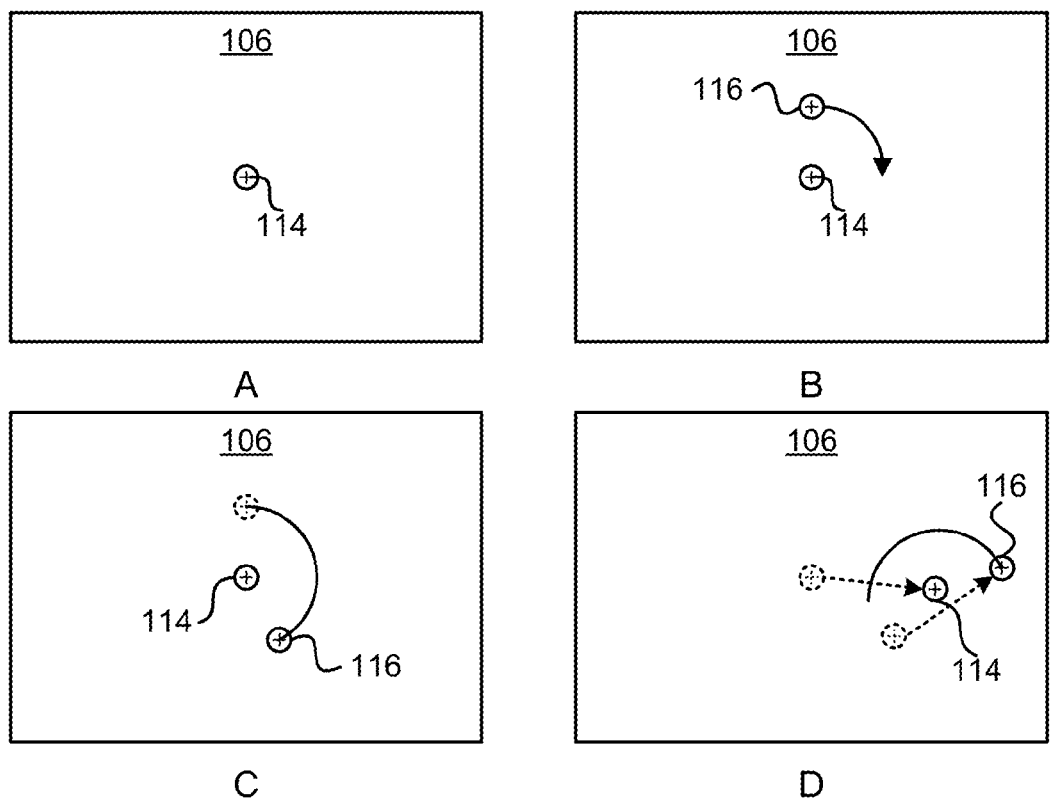
FIG. 6 is an illustration of one embodiment of steps of drawing a semicircle.

FIG. 6 is an illustration of one embodiment of steps of drawing a semicircle. Steps A-D are depicted for drawing the semicircle on the display 106. Step A depicts the display 106 with a first user touch 114 depicted as a circle with a cross in the center indicating where the drawing apparatus 102 locates the first user touch 114. For example, the circle may indicate an area where a finger, stylus, pen, etc. may rest on the display 106. The cross indicates an approximate center of the area of the first user touch 114. The center of the cross may be used by the drawing apparatus 102 as a coordinate of the first user touch 114. Step B indicates the first user touch 114 along with a second user touch 116 above the first user touch 114 and then subsequent movement, indicated by the curved arrow. In the embodiment, the correlation module 208 correlates the pattern of the curved movement associated with the second user touch 116 with a semicircle as the drawing shape.

In Step C, the image module 210 forms a partial semicircle starting from the location where the user first initiated the second user touch 116 and extending to a current location of the second user touch 116. Note that the second user touch 116 has moved beyond the end of the curved line in Step B and a previous position of a user touch is depicted as a dashed circle and cross. The semicircle is centered about the location of the first user touch 114. The user may stop movement associated with the first user touch 114 and second user touch 116, for example in the locations shown in Step C. After expiration of a stoppage time delay, the sizing input module 310 may receive input indicating further movement associated with the first user touch 114 and the second user touch 116, and the position module 312 may move the semicircle, as depicted in Step D.

Figure 7:
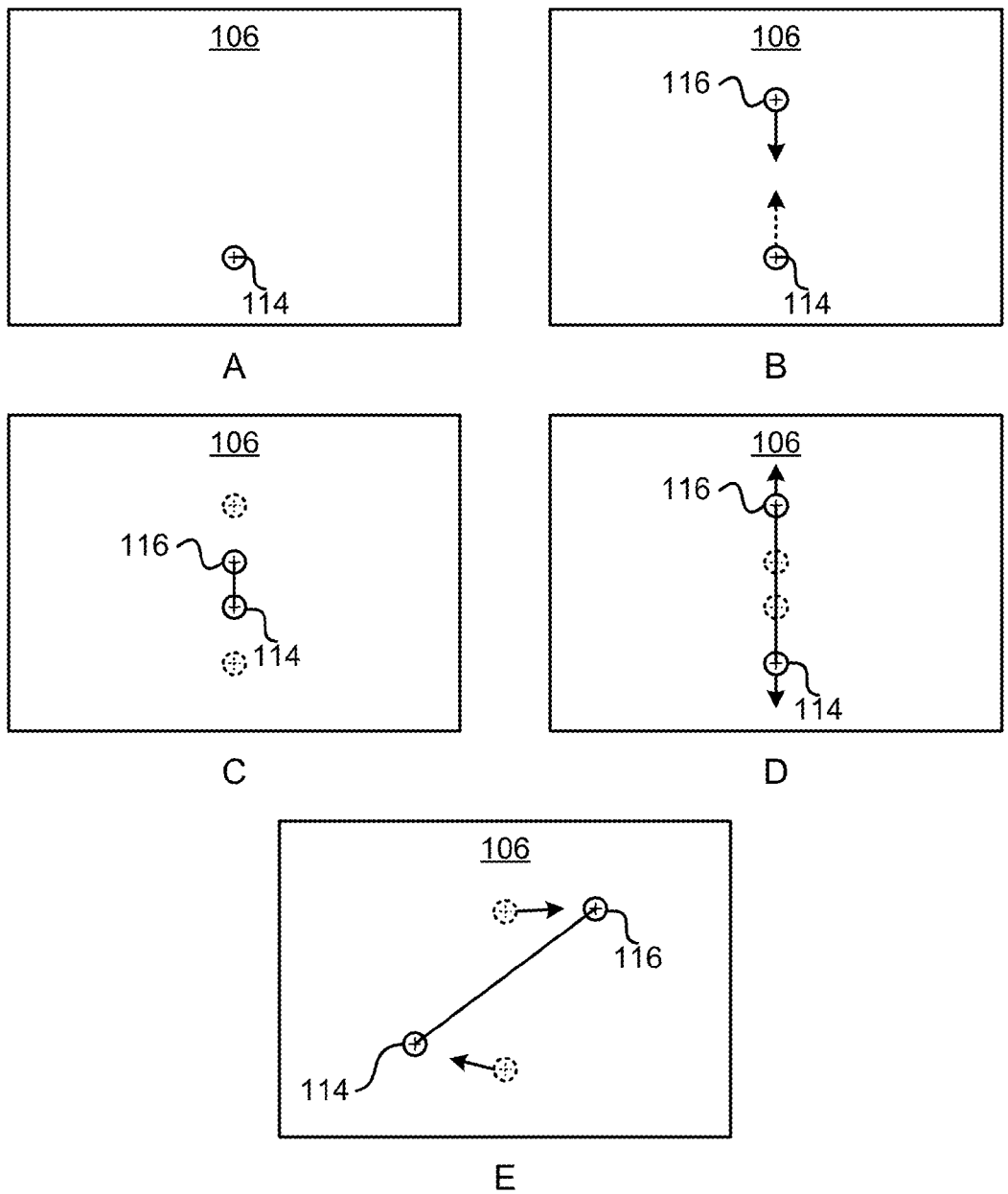
FIG. 7 is an illustration of one embodiment of steps of drawing a line.

FIG. 7 is an illustration of one embodiment of steps of drawing a line. Step A depicts the display 106 with a first user touch 114. Step B depicts a second user touch 116 and a pattern of movement in a line toward the first user touch 114. In one embodiment, the first user touch 114 may also move in a line toward the second user touch 116. In the embodiment, the correlation module 208 correlates the second user touch 116 and movement in a line toward the first user touch 114 and possibly movement of the first user touch 114 toward the second user touch 116 as a pattern indicative of a drawing shape of a line. Step C depicts the image module 210 forming the line between the first user touch 114 and the second user touch 116.

Step D depicts additional movement, for example received by the additional input module 304, where the first user touch 114 and the second user touch 116 are moving way from each other and the image module 210 extends the line between the current location of the first user touch 114 and the second user touch 116. The user may halt movement so that the stop module 306 detects stoppage of the first user touch 114 and the second user touch 116, for example in the positions depicted in step D. Step E depicts movement and resizing of the line after expiration of the stoppage time delay and possibly after the position signal module 314 sends a resize/reposition signal, as the first user touch 114 and the second user touch 116 are repositioned.

Figure 8:
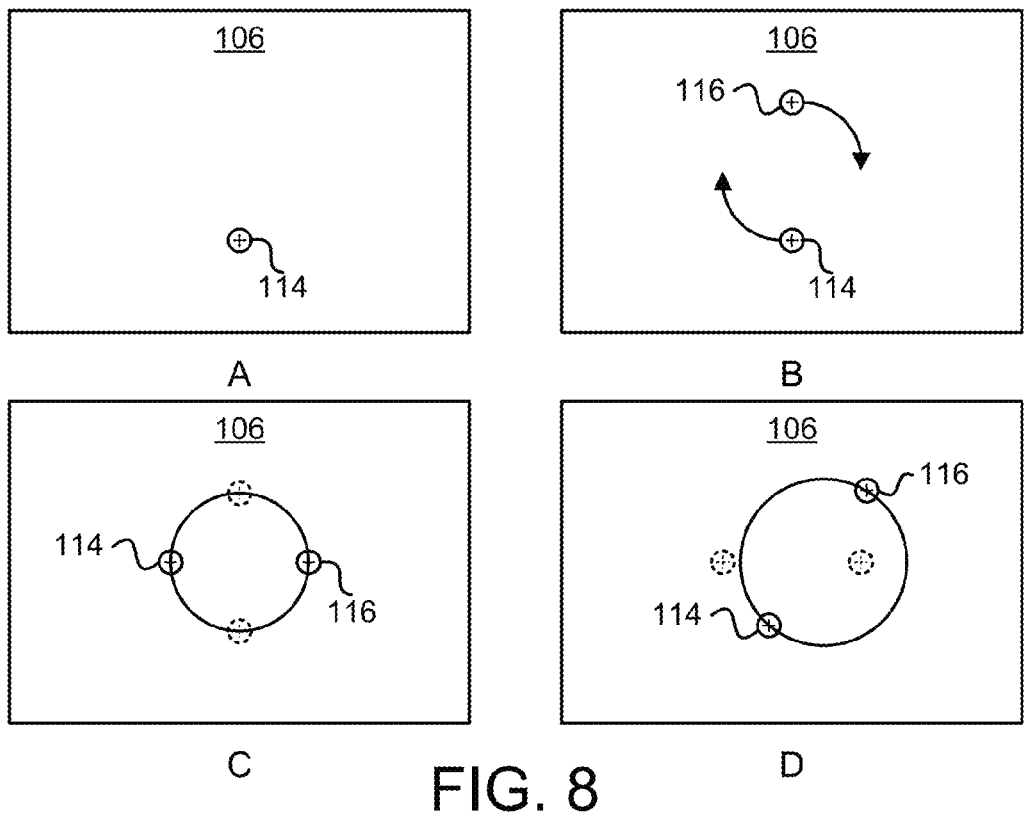
FIG. 8 is an illustration of one embodiment of steps of drawing a circle.

FIG. 8 is an illustration of one embodiment of steps of drawing a circle. Step A depicts the display 106 with a first user touch 114. Step B depicts the second user touch 116 on the display 106 and subsequent clockwise circular movement associated with the second user touch 116 as well as clockwise circular movement associated with the first user touch 114. In the depicted embodiment, the correlation module 208 correlates the dual circular movement pattern with a drawing shape of a circle and in Step C, the image module 210 forms a circle on the display 106. In one embodiment, the circle has a diameter from a current position of the first user touch 114 and the second user touch 116. Step C indicates that the circle moves and changes in diameter in response to additional movement associated with the first user touch 114 and the second user touch 116.

In one embodiment, the position module 312 and/or additional input module 304 may detect additional movement without a requirement of stoppage detected by the stop module 306 or a stoppage time delay counted out by the stop delay module 308 or a resize/reposition signal, but may commence resizing and/or repositioning the image after sensing the additional input and after the image module 210 forms the image of a circle. Other images may also be repositioned and/or resized in a similar manner. Some drawing shapes may benefit from requiring a stoppage of movement before resizing and/or repositioning.

Figure 9:
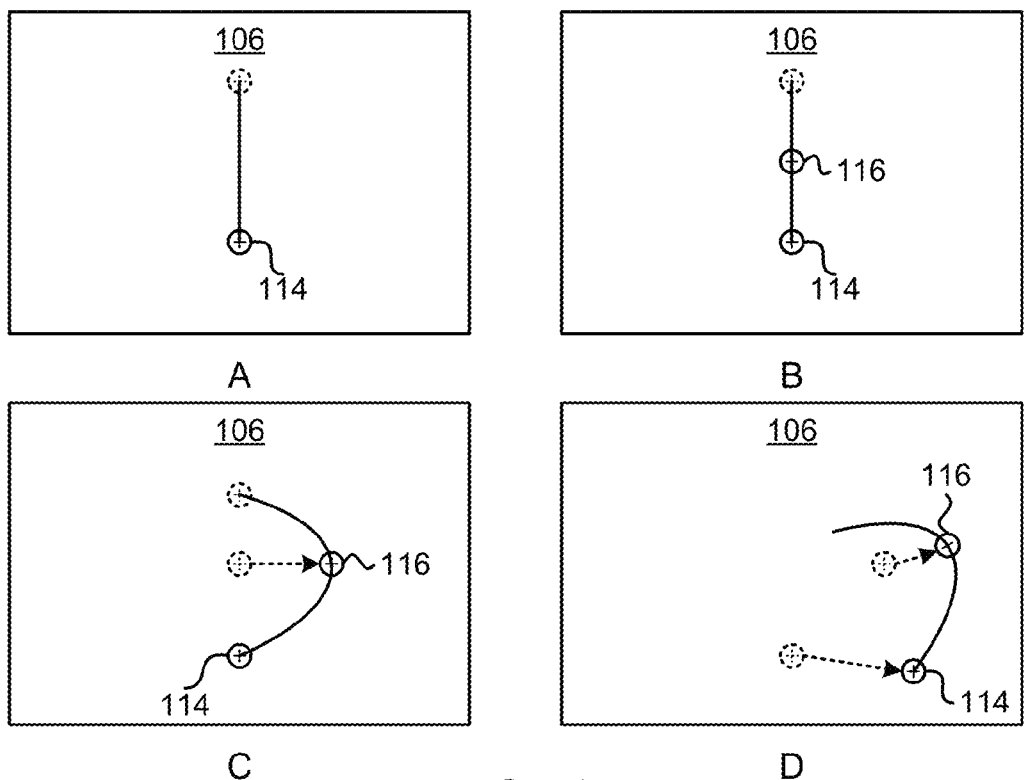
FIG. 9 is an illustration of one embodiment of steps of drawing an arc.

FIG. 9 is an illustration of one embodiment of steps of drawing an arc. Step A depicts the display 106 with a first user touch 114. In the depicted embodiment of Step A, the first user touch 114 starts at a location near the top of the display 106 and continues downward to the location depicted where movement stops. The image module 210 forms a line between the location where the first user touch 114 starts and stops. The confirmation module 302 may determine that the first user touch 114 has stopped and may send a confirmation signal if the first user touch 114 remains constant during a first touch time delay.

Step B depicts the second user touch 116 on the display 106 on or near the line between the start and stop points of the first user touch 114 and the correlation module 208 correlates the pattern of the first user touch movement and stoppage and then the second user touch 116 on the line between the start and stop points of the first user touch 114 with a drawing shape of an arc. Step C depicts movement of the second user touch 116 away from the initial position, and the image module 210 creates an arc with end points at the start and stop points of the first user touch 114 and extending to a current location of the second user touch 116. Step D depicts further movement of the first user touch 114 and second user touch 116 and movement of the arc, for example after maintaining the first user touch 114 and second user touch 116 at the locations in Step C for the stoppage time delay.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving first input from a touch screen display of an electronic device indicating a first user touch of a user at a fixed location on the touch screen display continuing for a first touch time delay;
sending a confirmation signal to the user in response to continuing the first user touch at a fixed location for the first touch time delay;
subsequent to said first touch time delay, receiving second input from the display indicating a second user touch in a pattern on the display;
correlating the first input and the second input with a drawing shape, the drawing shape comprising a standard geometric shape; and
forming an image on the display that corresponds to the drawing shape.

2. The method of claim 1, wherein orientation and sizing of the image is based on the first input and the second input and comprises one or more of:
a position of the first user touch;
a position of the second user touch; and
subsequent user movement in the pattern and associated with the second user touch.

3. The method of claim 1, further comprising:
receiving additional input from the display indicating one or more of:
further movement associated with the second user touch; and
movement associated with the first user touch; and
forming at least a portion of the image based on the additional input after correlating the first input and the second input to a drawing shape and forming at least a portion of the image from one or more of the first input and the second input.

4. The method of claim 1, further comprising:
receiving input from the display indicating a stoppage of movement associated with one or more of the first user touch and the second user touch wherein the first user touch maintains a fixed position and the second user touch maintains a fixed position;
determining that a stoppage time delay has expired;
receiving additional input after the stoppage time delay, the additional input indicating one or more of movement associated with the first user touch and movement associated with the second user touch; and
one or more of resizing and repositioning the image in response to the additional input.

5. The method of claim 4, further comprising sending a resize/reposition signal to the user in response to expiration of the stoppage time delay and prior to receiving the additional input.

6. The method of claim 1, wherein the image comprises a first image and wherein the first user touch comprises movement and maintaining the first user touch in a fixed position after the movement, and further comprising forming a second image on the display based on the movement associated with the first user touch and prior to maintaining the first user touch in a fixed position, wherein the first touch time delay starts in response to maintaining the first user touch in the fixed position.

7. The method of claim 6, wherein the first image is a continuation of the second image.

8. The method of claim 6, wherein the drawing shape comprises an arc and wherein the second image comprises a preliminary shape comprising a first point located at a position on the display associated with commencement of the first user touch and a second point located at a position on the display associated with the maintaining the first user touch in a fixed position and wherein the second user touch is on the second image, wherein the first image in the form of an arc is formed by subsequent user movement associated with the second user touch in a direction away from a line bisecting the first point and the second point.

9. The method of claim 1, wherein the drawing shape comprises a line and wherein the pattern, comprising subsequent user movement after the second user touch, comprises at least a movement that is toward a position of the first user touch, wherein receiving input from the display indicating subsequent user movement away from the position of the first user touch after movement toward the position of the first user touch is used to determine position, direction and length of the line.

10. The method of claim 1, wherein the drawing shape comprises a semicircle and wherein the pattern, comprising subsequent user movement after the second user touch, in a circular movement, wherein forming an image on the display comprises forming a semicircle starting at the second user touch wherein the semicircle ends at a position corresponding to a position where movement associated with the second user touch ends by one of stopping movement associated with the second user touch and ending the second user touch.

11. The method of claim 1, wherein the drawing shape comprises a circle and wherein the pattern, comprising subsequent user movement after the second user touch, comprises a circular movement in a first direction in conjunction with circular movement in the first direction subsequent to the first user touch and associated with the first user touch, wherein forming an image on the display comprises forming a circle with a diameter corresponding to a position of the first user touch and a position of the second user touch.

12. A program product comprising a non-transitory computer readable storage medium that stores executable code that is executable by a processor, the executable code comprising code to perform:
receiving first input from a touch screen display of an electronic device indicating a first user touch of a user at a fixed location on the touch screen display continuing for a first touch time delay;
sending a confirmation signal to the user in response to continuing the first user touch at a fixed location for the first touch time delay;
subsequent to said first touch time delay, receiving second input from the display indicating a second user touch in a pattern on the display;
correlating the first input and the second input with a drawing shape, the drawing shape comprising a standard geometric shape; and
forming an image on the display that corresponds to the drawing shape.

13. The program product of claim 12, the executable code further comprises code to perform:
receiving input from the display indicating a stoppage of movement associated with one or more of the first user touch and the second user touch wherein the first user touch maintains a fixed position and the second user touch maintains a fixed position;
determining that a stoppage time delay has expired;
receiving additional input after the stoppage time delay, the additional input indicating one or more of movement associated with the first user touch and movement associated with the second user touch; and
one or more of resizing and repositioning the image in response to the additional input.

14. An apparatus comprising: a first input module that receives first input from a touch screen display of an electronic device indicating a first user touch of a user at a fixed location on the touch screen display continuing for a first touch time delay; a confirmation module that sends a confirmation signal to the user in response to continuing the first user touch at a fixed location for the first touch time delay; a second input module that, subsequent to said first touch time delay, receives second input from the display indicating a second user touch in a pattern on the display; a correlation module that correlates the first input and the second input with a drawing shape, the drawing shape comprising a standard geometric shape; and an image module that forms an image on the display that corresponds to the drawing shape, wherein said modules comprise one or more of a hardware circuit, a programmable hardware device and a processor which executes code.

15. The apparatus of claim 14, further comprising:
an additional input module that receives additional input from the display indicating one or more of:
further movement associated with the second user touch; and
movement associated with the first user touch,
wherein the image module forms at least a portion of the image based on the additional input after the correlation module correlates the first input and the second input to a drawing shape and after the image module forms at least a portion of the image based on one or more of the first input and the second input.

16. The apparatus of claim 14, further comprising:
a stop module that receives input from the display indicating a stoppage of movement associated with one or more of the first user touch and the second user touch wherein the first user touch maintains a fixed position and the second user touch maintains a fixed position;
a stop delay module that determines that a stoppage time delay has expired;
a sizing input module that receives additional input after the stoppage time delay, the additional input indicating one or more of movement associated with the first user touch and movement associated with the second user touch; and
a position module that one or more of resizes and repositions the image in response to the additional input.

17. The apparatus of claim 14, further comprising a position signal module that sends a resize/reposition signal to the user in response to expiration of the stoppage time delay and prior to receiving the additional input.

\* \* \* \* \*